United States Patent
Wernet

(10) Patent No.: US 6,542,226 B1
(45) Date of Patent: Apr. 1, 2003

(54) PLANAR PARTICLE IMAGING AND DOPPLER VELOCIMETRY SYSTEM AND METHOD

(75) Inventor: Mark P. Wernet, Sheffield Village, OH (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 09/874,956

(22) Filed: Jun. 4, 2001

(51) Int. Cl.⁷ .................................................. G01P 3/36
(52) U.S. Cl. ........................................ 356/28.5; 356/28
(58) Field of Search .................................. 356/28, 28.5

(56) References Cited

U.S. PATENT DOCUMENTS

| | | | |
|---|---|---|---|
| 4,919,536 A | * 4/1990 | Komine | 356/28.5 |
| 4,988,190 A | * 1/1991 | Miles | 356/28 |
| 5,249,238 A | 9/1993 | Komerath | |
| 5,440,144 A | 8/1995 | Raffel | |
| 5,491,642 A | 2/1996 | Wormell | |
| 5,610,703 A | 3/1997 | Raffel | |
| 5,701,172 A | 12/1997 | Azzazy | |
| 5,751,410 A | * 5/1998 | Roehle et al. | 356/28 |
| 5,883,707 A | 3/1999 | Arndt | |
| 5,905,568 A | 5/1999 | McDowell | |
| 5,982,478 A | 11/1999 | Ainsworth | |
| 6,013,921 A | 1/2000 | Moller | |
| 6,108,458 A | 8/2000 | Hart | |

OTHER PUBLICATIONS

See Attached Sheet.

* cited by examiner

Primary Examiner—Stephen C. Buczinski
(74) Attorney, Agent, or Firm—Kent N. Stone

(57) ABSTRACT

A planar velocity measurement system (100) is operative to measure all three velocity components of a flowing fluid (106) across an illuminated plane (108) using only a single line of sight. The fluid flow is seeded with small particles which accurately follow the flow field fluctuations. The seeded flow field is illuminated with pulsed laser light source (102) and the positions of the particles in the flow are recorded on CCD cameras (122,124). The in-plane velocities are measured by determining the in-plane particle displacements. The out-of-plane velocity component is determined by measuring the Doppler shift of the light scattered by the particles. Both gas and liquid velocities can be measured, as well as two-phase flows.

37 Claims, 6 Drawing Sheets

PLANAR PARTICLE IMAGING AND DOPPLER VELOCIMETRY SYSTEM AND METHOD

TECHNICAL FIELD

This invention relates to planar velocity measurements. Specifically this invention relates to a planar velocity measurement system and method which requires only a single line of sight to measure all three velocity components of a fluid field flow across an illuminated plane.

BACKGROUND ART

Systems for planar velocity measurers of fluid field flows are well known. Examples of planar velocity measurement techniques include particle imaging velocimetry (PIV) and Doppler global velocimetry (DGV). In both of these techniques a laser is used to illuminate a fluid flow seeded with particles. With PIV the particle positions at multiple instances in time are recorded with CCD cameras. With DGV the Doppler shift in scattered laser light by particles in the flow is measured.

In general PIV is capable of providing 3-component flow field measurements using a two camera, stereo viewing configuration. An example of a PIV configuration 10 is shown in FIG. 1. Here two cameras 11, 12 view light 18 scattered from a seeded fluid 20 which pass through a pulsed laser illuminated sheet 14. The cameras are positioned in a common horizontal plane and are spatially separated. The accuracy of the out-of-plane velocity component is inversely proportional to the sine of the coupling angle 16 between the two cameras. The minimum error occurs at a coupling angle of about ±forty-five degrees. As a result the technique requires either two separate optical access ports to the fluid flow, or at least one large rectangular optical access port to the fluid flow.

DGV is also capable of providing 3-component flow field measurements. A typical DGV system installation is shown in FIG. 2. The technique 40 requires three receiver systems 42, 44, 46. located at oblique angles from the illuminated measurement plane 48. As shows in FIG. 3, each receiver system 42 includes two CCD cameras 62, 64, which share a common oblique view of the illumination sheet 48 through a beam splitting cube or plate beam splitter 60. The first camera 62 corresponds to a reference camera and views the illuminated flow directly. The second camera 64 corresponds to a signal camera and views the illuminated flow through an Iodine vapor cell 66.

The intensity of the Doppler shifted light passing through the Iodine cell is proportional to the frequency shift of the illuminated particles in the fluid flow 50. Because the frequency. shift is a function of the velocity of the particles in the fluid flow, the Iodine cell 66 acts as an intensity-to-velocity transducer. A velocity component of the fluid flow is derived from the ratio of the signal to reference images from the two CCD cameras 62, 64.

With DGV, the coupling angle between the different receiver systems 42, 44, 46 determines the accuracy of the different velocity components measured. If optical access points to a fluid point are not at oblique angles, poor discrimination in the resolved velocity components will result. Therefore, as with PIV, to achieve accurate 3-component velocity measurements, multiple access ports or very wide access ports are required.

Unfortunately with many flow field velocity measurement platforms such as aerospace propulsion testing platforms, optical access is extremely limited. Limited optical access is typically due to concerns regarding mismatched boundary conditions on walls or due to concerns regarding high thermal or mechanical stresses. In many of these platforms only a single optical access port is available. Consequently there exists a need for a new technique for obtaining planar velocity measurements of fluids which can measure all three components of velocity through a limited access optical viewing port.

DISCLOSURE OF INVENTION

It is an object of the exemplary form of the present invention to provide a system and method for obtaining planar velocity measurements of fluid flows.

It is a further object of the exemplary form of the present invention to provide a system and method for obtaining planar 3-component velocity measurements of fluid flows.

It is a further object of the exemplary form of the present invention to provide a system and method for obtaining planar 3-component velocity measurements of fluid flows through a limited access optical viewing port.

Further objects of the present invention will be made apparent in the following Best Modes For Carrying Out Invention and the appended claims.

The foregoing objects are accomplished in an exemplary embodiment of the invention by a velocimetry system and method that includes a single, component DGV receiver system configured to simultaneously acquire PIV image data. In one exemplary embodiment of the present invention, a seeded fluid flow field is illuminated with at least two laser pulses to form an illuminated light sheet. At least one of the laser pulses is generated from an injection seeded laser to satisfy the requirements of a DGV system. The second laser pulse may come from either an injection seeded laser or a standard Nd:YAG laser, for example.

The exemplary receiver system is orientated at an angle which is generally perpendicular to the illuminated light sheet plane. The receiver system includes two PIV "frame-straddling" cameras: a reference camera and a signal camera. The scattered light from particles in the illuminated light sheet are split into two beams by a beam splitter. One beam is imaged by the reference camera. The second beam is imaged by the signal camera after being passed through a molecular filter such as an Iodine vapor cell. The exemplary system enables the acquisition of PIV image frame pairs using both the reference and signal cameras. Each camera in the receiver obtains a pair of image frames responsive to at least two laser pulses. The image frames are processed using PIV processing techniques to acquire the complete 2-component in-plane velocity field of the fluid flow.

In the exemplary embodiment, the image frames from the signal and reference cameras are also processed using DGV processing techniques. The orientation of the receiver perpendicular to the illuminated light sheet enables the DGV system to measure the component of the flow velocity that lies forty-five degrees out-of-the plane of the illuminated light sheet. As a result the DGV velocity measurement can be combined with the in-plane PIV measurements to obtain the full 3-component velocity fields across the illuminated plane, through a single optical access port.

BEST MODES FOR CARRYING OUT INVENTION

Figure 1:
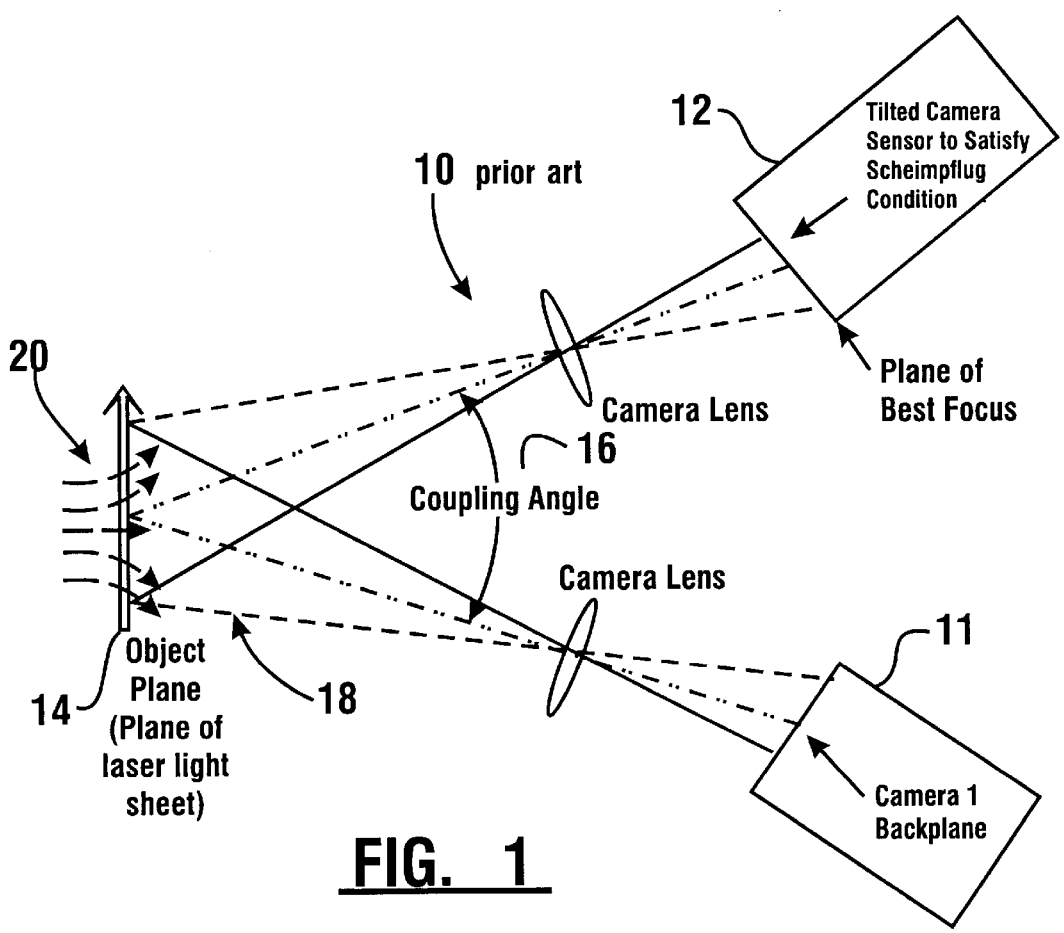
FIG. 1 is a schematic view representative of a prior art stereo viewing PIV optical configuration.
Figure 2:
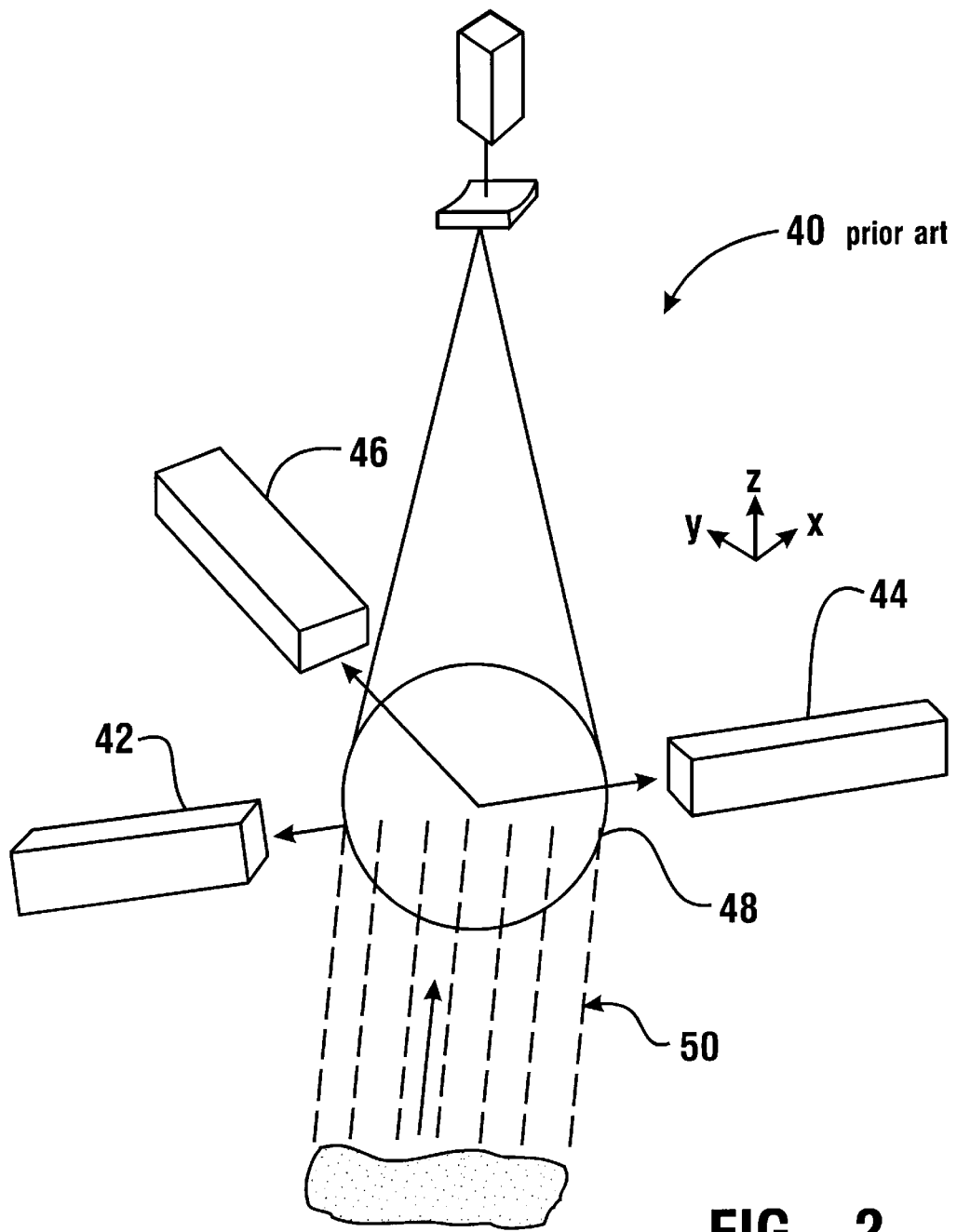
FIG. 2 is a schematic view representative of a prior art DGV optical configuration.
Figure 3:
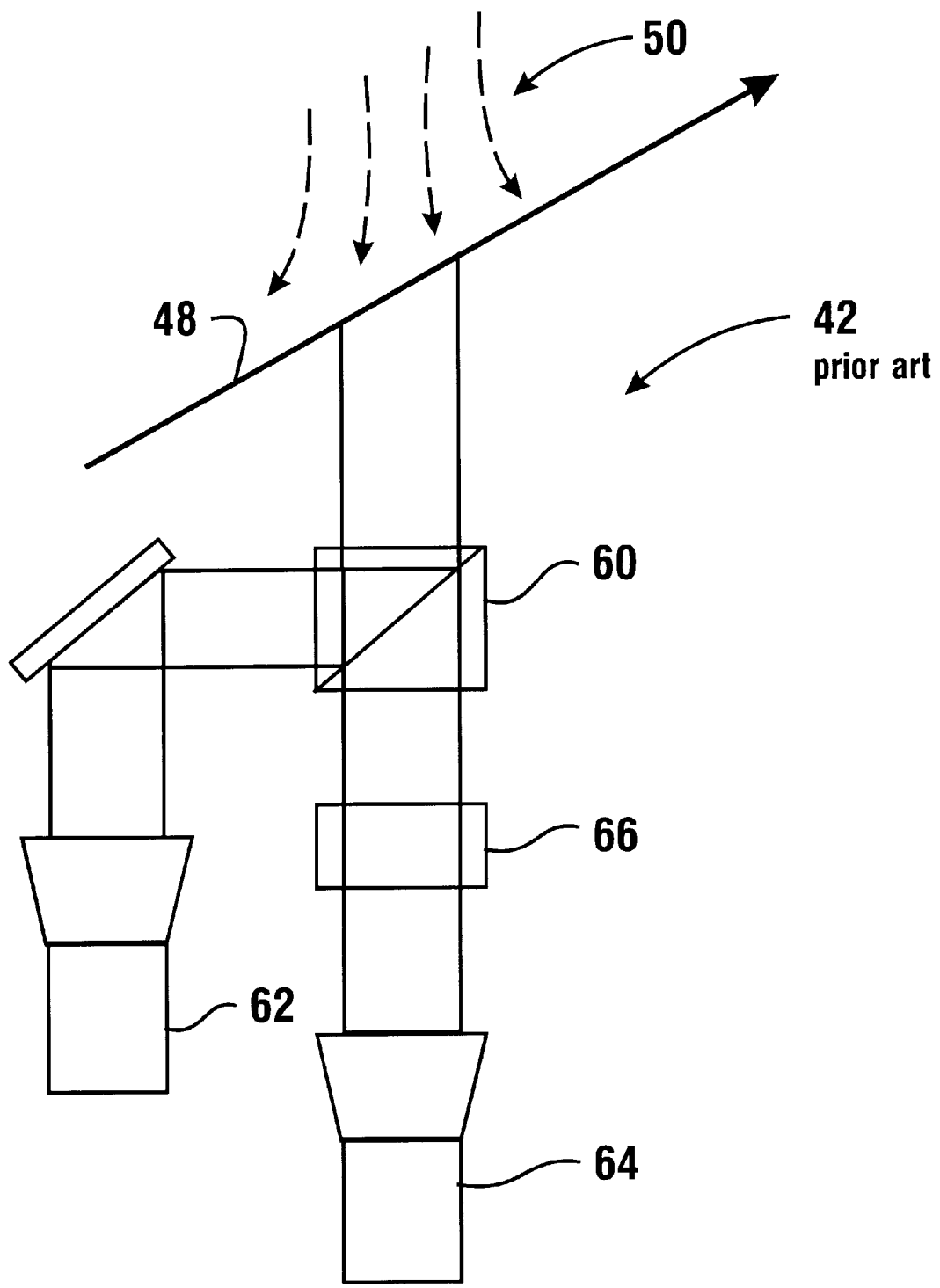
FIG. 3 is a schematic view representative of a prior art DGV receiving system illustrating oblique viewing of an illuminated light sheet.
Figure 4:
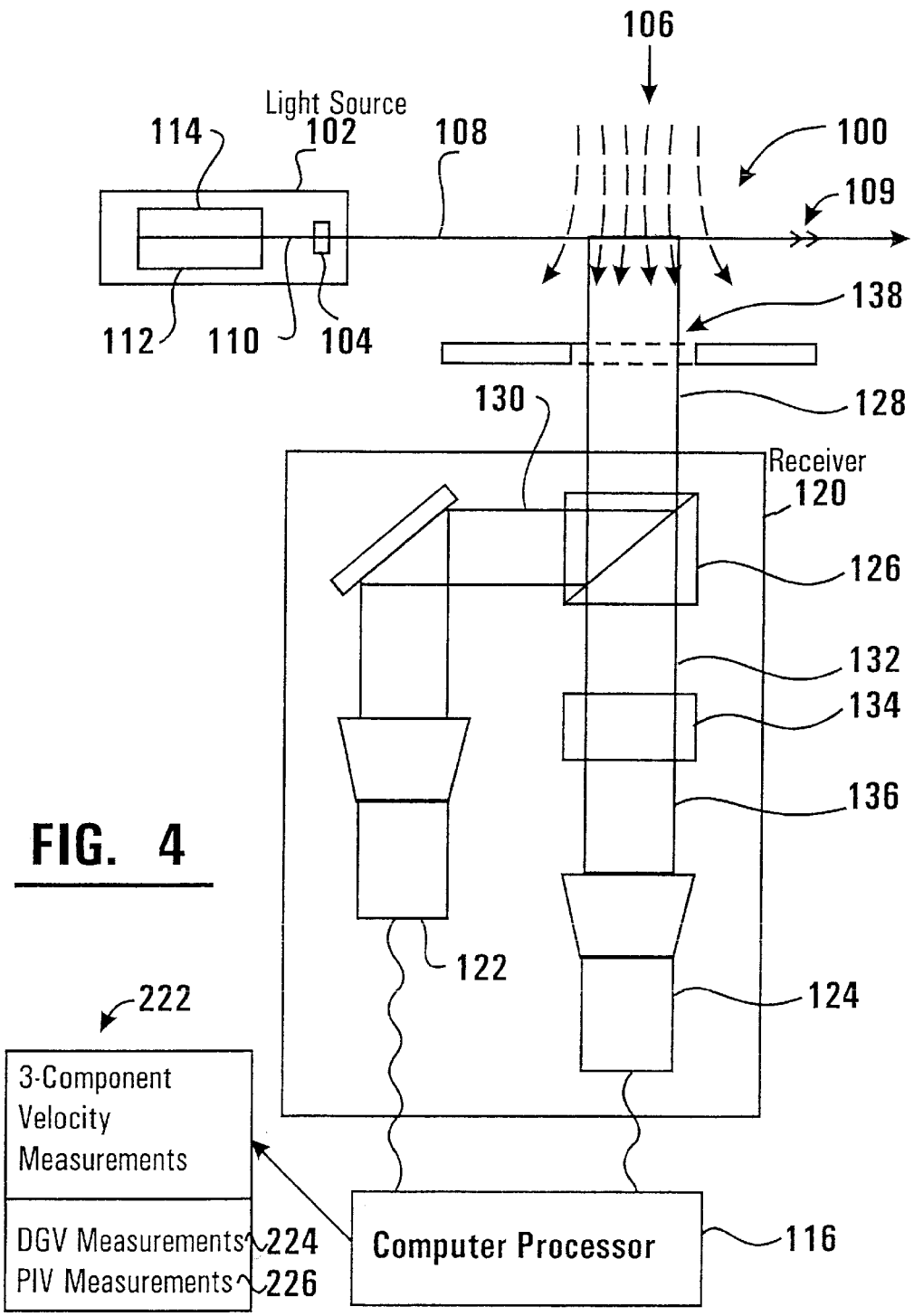
FIG. 4 is a schematic view representative of an exemplary planar particle imaging and Doppler velocimetry system of the present invention.

Referring now to the drawings and particularly to FIG. 4, there is shown therein a schematic view representative of a planar particle imaging and Doppler velocimetry system 100 of one exemplary embodiment of the present invention. The system includes a pulsed laser light source 102 that is operative to output pulses of light 110. In the exemplary embodiment the light source 102 includes a lens or lenses 104 which is operative to form an illuminated light sheet 108 for each pulse of laser light source 102. The laser light source 102 is positioned such that the illuminated light sheet is projected across a fluid flow 106 being measured by the system.

In one exemplary embodiment of the present invention, the light source 102 includes two lasers 112, 114 which are operatively configured to output pulses of light 110 which are coaxially aligned along a common line. As a result, the corresponding light sheets 108 formed by each pulse of each laser 112, 114 are coincident in position across the fluid flow 106. In the exemplary embodiment, at least one of the lasers 112, 114 is comprised of a laser that is suitable for DGV measurements such as an injection seeded laser with a line width on the order of 100 MHz. The second one of the lasers may be comprised of a laser that is suitable for PIV measurements such as a standard Nd:YAG laser. However, in alternative exemplary embodiments both lasers 112, 114 may also be comprised of an injection seeded laser.

In the exemplary embodiment, the fluid flow 106 is seeded with particles which are operative to scatter light in the illuminated light sheet 108. Examples of particles for seeding the fluid flow 106, may include atomized liquid particles such as vegetable oil and silicone oil; solid particles such as alumina. Exemplary embodiments of the present invention may further include seed particles such as titanium dioxide generated by mixing titanium tetrachloride vapor and moist air in the flow. Particles may also be generated by combustion. Monodisperse (uniform distribution of size) particles such as polystyrene latex suspended in a volatile liquid may also be used. It is to be understood that the present invention encompasses measuring velocity flow fields seeded with any particles that are operative to scatter light for performing both PIV and DGV measurements.

The exemplary embodiment of the present invention includes one receiver system 120 which is orientated to view light scattered generally perpendicular to the plane of the illuminated light sheet 108. In alternative exemplary embodiments oblique viewing may also be performed. The calibration of the system using a dot card target can be used to perform a warping of the distorted optical plane back to a rectilinear coordinate system.

The exemplary receiver system 120 includes a reference camera 122, a signal camera 124 and a beam splitter 126. The beam splitter 126 is operative to split the scattered light 128 viewed by the receiver 120 into two beams 130, 132. The first one of the beams 130 is directed to the reference camera 122. The second one of the beams 132 is directed to the signal camera 124. In the exemplary embodiment the cameras 122 and 124 are operative to capture a pair of single exposure image frames at high effective framing rates suitable for performing the PIV technique on air flows greater than 1 meter/second. In one exemplary embodiment, the cameras 122 and 124 are frame-straddling cameras. With frame straddling cameras the timing of the laser pulse is adjusted so that the first laser pulse occurs just at the end of the integration period for the first frame and the second laser pulse occurs just at the beginning of the integration period for the second frame. Although though the cameras may only operate at 30 or 15 frames/second, the frame stradling technique produces a high effective framing rate between the frame straddling image pairs.

In the exemplary embodiment of the present invention, the receiver 120 includes a molecular filter 134 such as an Iodine vapor cell between the beam splitter and the signal camera 124. The molecular filter is operative to absorb Doppler shifted light in the beam 132 in proportion to the frequency shift of the scattered light. Because the frequency shift is a function of the flow velocity, the resulting filtered beam 136 yields an image of the flow in which the intensity is proportional to the local flow velocity. Hence the molecular filter 134 is operative as an intensity-to-velocity transducer. In this described exemplary embodiment the light pulses are emitted at the second harmonic of the Nd:YAG Laser ($\lambda$=532 nm) in order to be within the $I_2$ absorption bands of the Iodine vapor cell.

In the exemplary embodiment of the present invention, the absorption profile slope and optical density of the molecular filter 134 are adjusted to encompasses a range of anticipated Doppler frequency shifts by changing the temperature and pressure of iodine vapor in the cell. The laser injection seeder voltage on the Nd:YAG laser is adjusted so that the center frequency of the laser light is in general at the midpoint of the transition edge in between the maximum absorption and maximum transmission of the filter. With this arrangement, the molecular filter transmission is directly related to the Doppler shift of the flow velocity component. In exemplary embodiments of the present invention, the molecular filter may include Doppler-broadened filters and Lorentz or pressure broadened filters.

The exemplary configuration of the present invention is operative to acquire 3-component velocity measurements of the fluid flow 106 from a single optical access point 138 of the system 100. As a result the present invention may be used to measure high speed fluid flows in wind tunnels, turbines, nozzles, or any other fluid test platform which may have only one optical access point. Measurements are performed by pulsing the light source at least twice to produce two light pulses 109, wherein at least one of the pulses originates from an injected seeded laser 112. Images of the light scattered from these pulses are captured by both the reference and signal cameras 122, 124 and are processed by at least one computer processing system 116 in operative connection with the cameras. In embodiments where the lasers are pulsed twice, two image frames are captured from each of the two cameras 122, 124. A first set of image frames R1 and R2 are captured by the reference camera 122. A second set of image frames S1 and S2 are captured by the signal camera 124.

The exemplary processing system 116 is operatively programmed to perform both PIV and DGV image processing on the image frames collected by the signal and reference cameras 122, 124 during the laser pulses. The exemplary processing system 116 is operative to perform standard PIV data processing techniques to obtain the complete 2-component in-plane velocity field. The PIV data processing includes the processing of the R1 and R2 image frames captured by the reference camera 122. In the exemplary embodiment, the PIV technique provides velocity estimates that are theoretically accurate to about 1% of fullscale.

The PIV processing by the processing system 116 includes either dividing the images up into small interrogation regions and determining the average displacement of the particles or by determining the individual particle displacement captured by the cameras between successive pulses of the illuminated light sheet. Knowledge of the time interval between light sheet pulses permits the exemplary processing system 116 to compute the in-plane flow velocity components using the formula:

$$V = \frac{\Delta x}{M \cdot \Delta t} \quad (1)$$

where $\Delta x$ is the measured displacement, M is the optical system magnification, and $\Delta t$ is the time between exposures.

The exemplary processing system 116 is further operative to perform standard DGV processing techniques from at least one of the sets of image frames (R1,S1 or R2,S2) captured by the reference and signal cameras 122, 124 from the pulse of the at least one injection seeded laser 112. The processing system 116 is operative to perform DGV processing to measure the component of the flow velocity that lies forty-five degrees out-of-the plane of the illuminated light sheet 106. If both sets of image frames (R1,S1 or R2,S2) are generated from injection seeded lasers, the exemplary system is operative to average the resulting velocity calculations to improve the accuracy of the velocity measurement. When performing the DGV processing, the exemplary processing system 116 is operative to normalize the images (S1, S2) captured with the signal camera with the images (R1, R2) captured by the reference camera 122. Normalization is performed to account for the effects of nonuniform particle size, nonuniform particle number density distributions and variations in laser intensity across the light sheet. Based on the measured intensity change of the normalized image, the exemplary system is operative to calculate the Doppler shift across the illuminated light sheet. Once the optical shift has been obtained using DGV processing techniques, the exemplary processing system 116 is operative to obtain the full 3-component velocity field 222 across the illuminated light sheet 108, by combining the DGV velocity measurement 224 with the in-plane PIV measurements 226.

Figure 5:
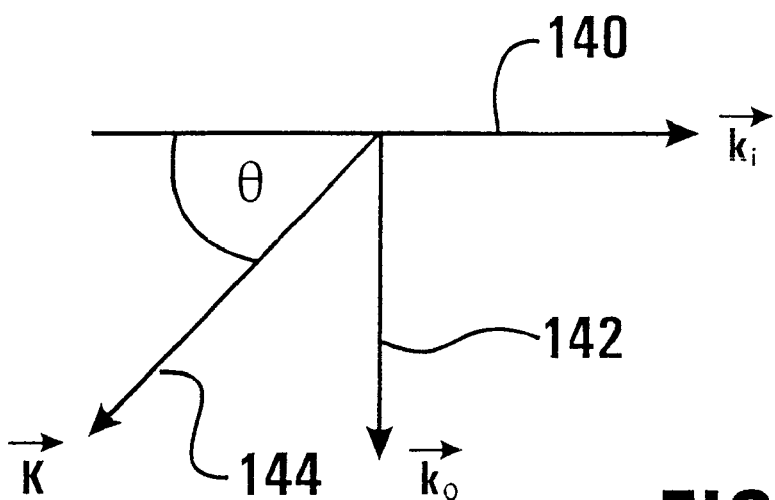
FIGS. 5 and 6 are graphs showing vectors involved with the calculation of the out-of-plane velocity components.

FIG. 5 illustrates the illumination direction ($\vec{k}_i$) 140 mind observation direction ($\vec{k}_o$) 142 involved in one exemplary embodiment of the present invention The out-of-plane velocity component ($\vec{K}$) 144 is obtained from the DGV technique which measures the Doppler shift of the scattered light along a component direction which lies forty-five degrees to the plane of the light sheet, in a plane defined by the light sheet propagation direction $\vec{k}_i$ and the camera observation direction $\vec{k}_o$. Thee resulting out-of-plane velocity component $\vec{K}$ corresponds to $\vec{k}_i - \vec{k}_o$ and makes an angle $\theta$ with the incident light sheet propagation direction $\vec{k}_i$.

In the exemplary embodiment, the processing system 116 obtains the velocity measurements in a 3-dimensional velocity space consisting of the components U, V, and W, which point in the $\vec{i}$, $\vec{j}$, and $\vec{k}$ unit vector directions. The PIV technique yields the in-plane velocity components (U and V), which point in the $\vec{i}$ and $\vec{j}$ directions. The Doppler frequency shift measured by the DGV technique is given by the equation:

$$\Delta f = \frac{\vec{A} \cdot \vec{K}}{\lambda_o} \quad (2)$$

where $\vec{A}$ is a 3-dimension velocity vector ($U_i + V_j + W_k$), $\vec{K}$ is the DGV measured velocity component direction, $\Delta f$ is the measured Doppler shift (in Hz), and $\lambda_o$ is the laser light frequency (in units of length). The velocity measurement obtained from the DGV technique is:

$$Z = \Delta f \lambda_o \quad (3)$$

where Z points in the $\vec{K}$ direction. The desired results calculated by the exemplary processing system 116 are estimates of the U, V, and W components of velocity. The Z component measured by the DGV system is not in the $\vec{i}$, $\vec{j}$, $\vec{k}$ coordinate system. As a result the exemplary processing system 116 is operative to rotate the Z component into the correct coordinate system in order to obtain the W component of velocity in terms of Z and −U. Note that due to the optical system configuration in the exemplary embodiment, the DGV measured component of velocity lies in the $\vec{i} - \vec{k}$ plane.

Figure 6:
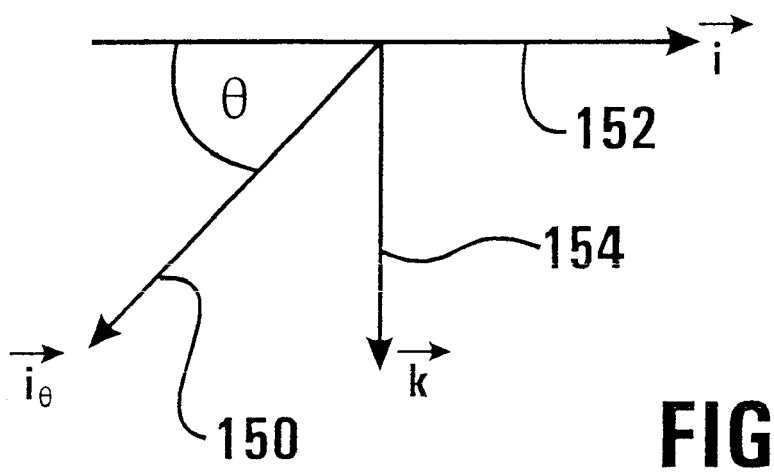

FIG. 6 shows these relationships in terms of vector notation. Here the coordinate vector 150 aligned with the DGV measured Z velocity component is $\vec{i}_\theta$. The U and W components are aligned in the $\vec{i}$ and $\vec{k}$ unit vector directions 152, 154, respectfully. The unit vector pointing in the direction of the DGV measured velocity component Z, written in terms of $\vec{i}$ and $\vec{k}$ is:

$$\vec{i}_\theta = -\vec{i}(\cos \theta) + \vec{k}(\sin \theta) \quad (4)$$

With the vector length:

$$Z\vec{i}_\theta = -U\vec{i}(\cos \theta) + W\vec{k}(\sin \theta) \quad (5)$$

Rearranging and solving for W produces:

$$W\vec{k} = \frac{Z\vec{i}_\theta}{\sin\theta} + U\vec{i}\left(\frac{\cos\theta}{\sin\theta}\right) \quad (6)$$

which is the expression for obtaining the out-of-plane velocity estimate W in terms of the measured DGV velocity estimate Z (which lies in the $\vec{K}$ direction and which is the same as the $\vec{i}_\theta$ direction) and the PIV velocity estimate for U. In the exemplary embodiment the V component of velocity measured with the PIV technique is not involved in the estimate of W since the camera observation plane lies in the $\vec{i} - \vec{k}$ plane. In alternative exemplary embodiments, if the observation direction is moved out of the $\vec{i} - \vec{k}$ plane, then the W component will also be a function of the V component of velocity.

In general the PIV technique requires imaging of individual particles, while the DGV technique requires multiple particles per pixel on the CCD of the cameras. DGV is theoretically capable of providing velocity measurements at every pixel in the CCD array provided there is sufficient particle seeding in the flow and that laser speckle is eliminated. Laser speckle results from the interference of light of nonuniform phase caused when coherent light is scattered by particles of a nonuniform distribution. The exemplary processing system is operative to remove the adverse effects of laser speckle by performing N×N pixel spatial averaging during DGV processing, where N=1, 2, 3, . . . as needed to remove speckle noise.

To reduce the need for high seed particle concentrations typically required in DGV techniques, the exemplary processing system is operative to spatially average the DGV processed images over subregions corresponding to the size of the PIV subregions, thereby yielding the same spatial resolution as the PIV measurements. In one exemplary embodiment of the present invention 1024×1024 pixel images are captured and are processed using 32×32 pixel subregions. In other exemplary embodiments, other image resolutions and subregion sizes may be used depending on the flow velocity being measured, seed particle concentration, and the desired precision of the velocity measurements.

Alternative exemplary embodiments of the present invention may further use a single camera to capture the reference and signal image frames for each pulse of the lasers. In such an alternative exemplary embodiment, the reference beam would be directed to a first portion of the CCD of the single camera and the signal beam would be directed to a second portion of the CCD of the single camera.

In addition alternative exemplary embodiments of the present invention may use the captured single image frames (S1, S2) to further increase the accuracy of the PIV calculations. In this described exemplary embodiment, the Doppler shift information may be used to assist in the correlation of particles captured in the images for each of the pulses of the lasers.

Exemplary embodiments of the present invention may further include a frequency monitoring device. Laser light frequency generally varies from pulse to pulse of the laser. In addition, there is often a significant variation in frequency across the laser beam which may produce variations in laser frequency across the light sheet. These variations may result is velocity estimate errors in the estimated out-of-plane velocity component W. In one exemplary embodiment of the present invention a laser diode may be used to provide a single point estimate of the laser frequency. A further exemplary embodiment of the present invention may include a frequency monitory device that is operative to measure the spatial variation and pulse to pulse variations in laser light frequency. The exemplary processing system is operative to use the measured light frequency information in its calculations to provide a more accurate estimate for the out-of-plane velocity component W.

Figure 7:
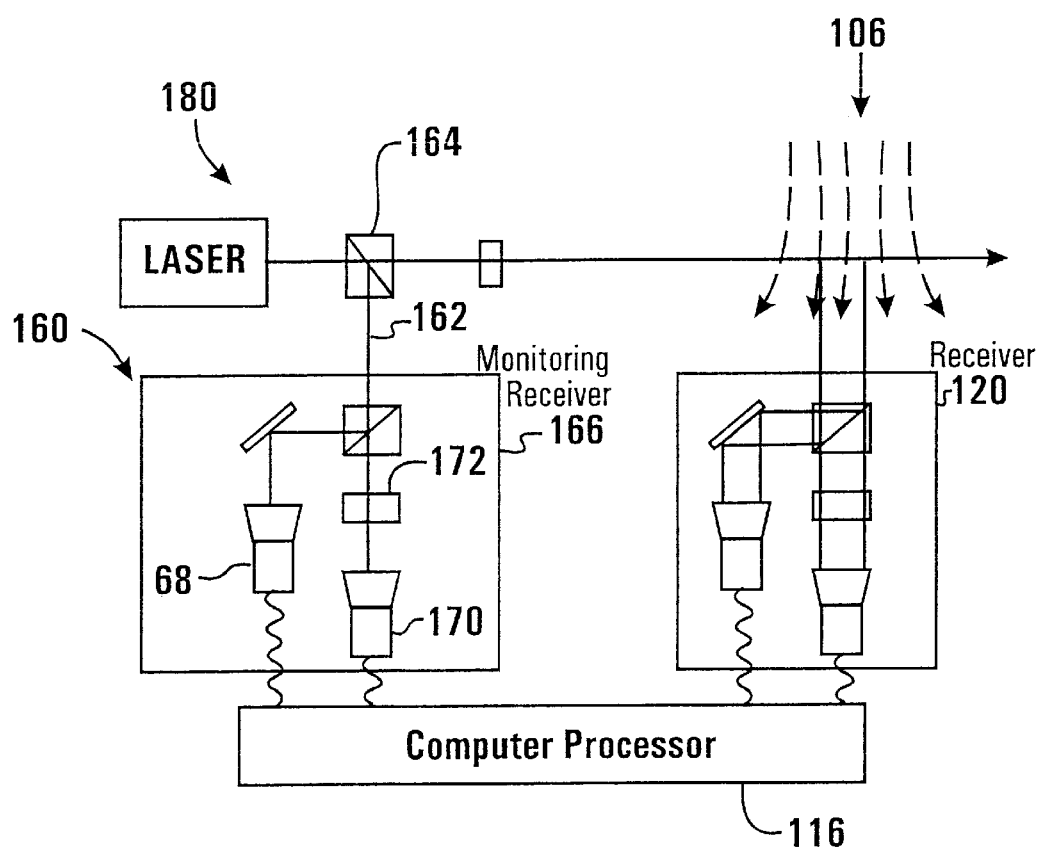
FIG. 7 is a schematic view representative of an exemplary frequency monitoring device of the present invention.

FIG. 7 shows an exemplary embodiment of a frequency monitoring system 160. Here a portion of the laser light 162 is directed with a beam splitter 164 to a monitoring receiver 166. The monitoring receiver 166 includes a pair of CCD cameras 168, 170. If the laser light source 180 includes two injection seeded lasers, the pair of cameras 168, 170 may be frame stradling cameras.

A first one of the receivers 168, is operative to capture reference image frames of each pulse of light. The second one of the receivers 170 is operative to capture signal image frames of each pulse of light after being filtered by a molecular filter 172. The exemplary processing system 116 is operative to process the reference and signal image frames to estimate the spatial variation in laser frequency for each pulse of the laser 180. The exemplary processing system is further operative to calculate the out-of-plane velocity components responsive to the measured spatial variation in laser frequency.

Thus the planar particle imaging and Doppler velocimetry system and method of the present invention achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following-claims any feature described as a means for performing a function shall be construed as encompassing any means known to those skilled in the art to be capable of performing the recited function, and shall not be limited to the features and structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

I claim:

1. A method for obtaining 3-component velocity measurements of fluid flows comprising
   a) providing a fluid flow seeded with particles;
   b) directing at least two pulses of laser light through the fluid flow, wherein each pulse projects an illuminated light plane through the fluid flow;
   c) splitting scattered light from the light plane into two beams, wherein the two beams include a reference beam, and a signal beam;
   d) directing the signal beam through a molecular filter;
   e) capturing image frames from each of the pulses of laser light, wherein the image frames include at least one reference image frame of the reference beam and at least one signal image frame of the signal beam after being directed through the molecular filter;
   f) calculating a plurality of in-plane velocity components of the fluid flow responsive to at least two of the image frames each corresponding to a different pulse of the laser light; and
   g) calculating a plurality of out-of-plane velocity components of the fluid across the light plane responsive to at least a portion of the in-plane velocity components and responsive to at least one reference image frame and at least one signal image frame corresponding to a common pulse of the laser light.

2. The method according to claim 1, wherein in step (c), the scattered light from the light plane passes through a single optical access point adjacent the light plane.

3. The method according to claim 1, wherein in step (c), the scattered light split by the beam splitter includes light scattered from the light plane in a direction generally perpendicular to the light plane.

4. The method according to claim 1, wherein step (g) includes measuring a plurality of Doppler frequency shifts of the scattered light from the fluid flow across the light plane.

5. The method according to claim 4, wherein step (g) includes determining differences in light intensity between portions of the at least one signal frame and corresponding portions of the at least one reference frame.

6. The method according to claim 5, further comprising:
h) tuning a laser injection seeder voltage associated with the common pulse of the laser light so that the Doppler frequency shifts are, on average, at about the midpoint of the transition edge in between the maximum absorption and maximum transmission of the molecular filter.

7. The method according to claim 6, further comprising:
i) adjusting the temperature and pressure of the molecular filter to achieve an absorption profile slope that encompasses a range of the Doppler frequency shifts.

8. The method according to claim 4, wherein step (g) includes calculating a plurality of oblique velocity components of the fluid flow responsive to the Doppler frequency shifts and the wavelength of the at least one pulse of laser light, wherein the oblique velocity components lie at an oblique angle with respect to the light plane, and wherein step (g) further includes calculating the out-of-plane velocity components of the fluid flow responsive to the oblique velocity components, the oblique angle, and the in-plane velocity components.

9. The method according to claim 8, wherein in step (g) the oblique angle is about forty-five degrees.

10. The method according to claim 1, wherein in step (g) the common pulse of the laser light corresponds to laser light from an injection seeded laser.

11. The method according to claim 1, wherein step (g) includes performing Doppler global velocimetry image processing responsive to the at least one reference image frame and the at least one signal image frame.

12. The method according to claim 11, wherein step (g) includes performing Doppler global velocimetry image processing responsive to at least two reference image frames and at least two signal image frames corresponding to the at least two of the pulses of laser light.

13. The method according to claim 11, wherein step (f) includes performing particle imaging velocimetry image processing responsive to at least two signal image frames corresponding to the different pulses of the laser light.

14. The method according to claim 11, wherein step (f) includes performing particle imaging velocimetry image processing responsive to at least two reference image frames corresponding to the different pulses of the laser light.

15. The method according to claim 1, wherein step (f) includes performing particle imaging velocimetry image processing responsive to the signal image frames and the reference image frames corresponding to the different pulses of the laser light.

16. The method according to claim 1, wherein step (f) includes calculating the plurality of in-plane velocity components of the fluid flow responsive to at least two reference image frames corresponding to the different pulses of the laser light.

17. The method according to claim 16, wherein step (f) further includes calculating the plurality of in-plane velocity components of the fluid flow responsive to at least two signal image frames corresponding to the different pulses of the laser light.

18. The method according to claim 1, wherein in step (e) the image frames are captured by at least one frame straddling camera.

19. The method according to claim 18, wherein in step (e) the at least one reference image frame and the at least one signal image frame are captured by adjacent portions of the frame straddling camera.

20. The method according to claim 18, wherein in step (e) the at least one reference image frame is captured by a first frame straddling camera and the at least one signal image frame is captured by a second frame straddling camera.

21. The method according to claim 1, wherein after step (a) further comprising:
h) directing a portion of each pulse of laser light to a frequency monitoring device;
i) measuring frequency variations of the portion of each pulse of laser light with the frequency monitoring device; and
wherein in step (g) the plurality of out-of-plane velocity components are further calculated responsive to the frequency variations.

22. The method according to claim 21 further comprising:
j) splitting the portion of each pulse of laser light into two further beams; wherein the two further beams include a further reference beam, and a further signal beam;
k) directing the further signal beam through a further molecular filter;
l) capturing further image frames from each of the pulses of laser light, wherein the further image frames include a further reference image frame of the further reference beam and a further reference signal image frame of the further signal beam after being directed through the further molecular filter; and
wherein in step (i) the frequency variations are calculated responsive to captured further image frames.

23. A velocimetry apparatus comprising:
a laser light source, wherein the laser light source is operative to output at least two pulses of laser light through a fluid flow seeded with particles, wherein the laser light forms an illuminated light plane through the fluid flow;
a beam splitter, wherein the beam splitter is operative to split scattered light from the light plane into a reference beam and a signal beam for each pulse of the laser light;
a molecular filter, wherein the molecular filter includes a molecular absorption feature that is operative to filter the signal beam responsive to the Doppler frequency shift associated with particles illuminated in the light plane, wherein an operating frequency of the laser is tuned to coincide with the molecular absorption feature;
at least one camera, wherein the at least one camera is operative to capture a plurality of image frames corresponding to the reference beam and signal beam for the at least two, pulses of laser light, wherein the image frames include at least one reference image frame of the reference beam and at least one signal image frame of the signal beam after being filtered by the molecular filter; and
at least one computer processor in operative connection with the at least one camera, wherein the at least one computer processor is operative to calculate a plurality of in-plane velocity components of the fluid flow responsive to at least two of the image frames, each corresponding to a different pulse of the at least two pulses of laser light, and wherein the at least one computer processor is operative to calculate the out-of-plane velocity components of the fluid flow responsive to the calculated in-plane velocity components and responsive to the reference image frame and the signal image frame corresponding to a common pulse of the at least two pulses of the laser light.

24. The apparatus according to claim 23, wherein the laser light source is operative to emit at least one pulse of laser light that has a bandwidth of about 100 MHz.

25. The apparatus according to claim 23, wherein the laser light source includes at least one injection seeded Nd:YAG laser.

26. The apparatus according to claim 23, wherein the laser light source includes two injection seeded lasers.

27. The apparatus according to claim 23, farther comprising an optical access port between the fluid flow and the beam splitter, wherein the beam splitter and the optical access port are orientated along a line that is generally perpendicular to the light plane.

28. The apparatus according to claim 23, wherein a molecular filter includes an iodine cell.

29. The apparatus according to claim 23, wherein the at least one camera includes a frame straddling camera.

30. The apparatus according to claim 29, and further comprising a second camera, wherein the first camera is operative to capture reference image frames, wherein the second camera is operative to capture the signal image frames.

31. The apparatus according to claim 23, wherein the computer processor is operative to perform particle imaging velocimetry image processing on at least two reference image frames, each corresponding to a different pulse of the at least two pulses of laser light.

32. The apparatus according to claim 23, wherein the computer processor is operative to perform Doppler global velocimetry image processing on the reference image frame and the signal image frame corresponding to the common pulse of the at least two pulses of the laser light.

33. The apparatus according to claim 32, wherein the computer processor is operative to calculate a plurality of Doppler frequency shifts of the scattered light responsive to the reference image frame and the signal image frame corresponding to the common pulse of the at least two pulses of the laser light.

34. The apparatus according to claim 33, wherein the computer processor is operative to calculate a plurality of oblique velocity components of the fluid flow responsive to the calculated Doppler frequency shifts and a value that corresponds to the wavelength of the laser light.

35. The apparatus according to claim 34, wherein the computer processor is operative to calculate the out-of-plane velocity components responsive to the calculated oblique velocity components, an oblique angle associated with the oblique velocity components, and the calculated in-plane velocity components.

36. The apparatus according to claim 23, further comprising a frequency monitoring device, wherein the frequency monitor device is operative to measure frequency variations of the pulses of laser light, wherein the computer processor is operative to calculate the out-of-plane velocity components of the fluid flow responsive to the frequency monitoring device.

37. A method for obtaining 3-component velocity measurements of fluid flows comprising:

a) providing a fluid flow seeded with particles;

b) directing two pulses of laser light through the fluid flow, wherein each pulse projects an illuminated light plane through the fluid flow;

c) receiving scattered light from the light plane which is adjacent a common line of sight to the light plane for each pulse of the laser light;

d) splitting the scattered light for each pulse of laser light into two beams with a beam splitter, wherein the two beams include a reference beam and a signal beam;

e) directing the signal beam through a molecular filter;

f) capturing at least two reference image frames of the reference beam, wherein each of the two reference image frames corresponds to a different pulse of the laser light;

g) capturing at least one signal image frame of the signal beam for at least one of the two pulses of the laser light after the signal beam has passed through the molecular filter;

h) determining in-plane particle displacements between the two pulses of laser light, responsive to the two reference image frames;

i) calculating a plurality of in-plane velocity components of the fluid flow responsive to the determined in-plane particle displacements and a time interval between the two pulses of laser light;

j) determining the Doppler shift of the light scattered by the particles responsive to both the signal image frame captured in step (g) and at least one reference image frame captured in step (f) which corresponds to the same pulse of the laser light as the signal image frame captured in step (g); and k) calculating a plurality of out-of-plane velocity components of the fluid across the light plane responsive to the determined Doppler shift of the light scattered by the particles and at least a portion of the in-plane velocity components calculated in step (h), whereby from the common line of sight three dimensional velocity measurements for the fluid flow are obtained.

* * * * *